US011159744B2

(12) United States Patent
Aihara et al.

(10) Patent No.: US 11,159,744 B2
(45) Date of Patent: Oct. 26, 2021

(54) IMAGING SYSTEM, AND MOBILE SYSTEM

(71) Applicant: PANASONIC INTELLECTUAL PROPERTY MANAGEMENT CO., LTD., Osaka (JP)

(72) Inventors: Masayuki Aihara, Osaka (JP); Shigenori Yatsuri, Osaka (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 511 days.

(21) Appl. No.: 15/888,002

(22) Filed: Feb. 3, 2018

(65) Prior Publication Data

US 2018/0160052 A1 Jun. 7, 2018

Related U.S. Application Data

(63) Continuation of application No. PCT/JP2017/024295, filed on Jul. 3, 2017.

(30) Foreign Application Priority Data

Jul. 22, 2016 (JP) .............................. JP2016-144866

(51) Int. Cl.
*H04N 5/265* (2006.01)
*G02B 3/02* (2006.01)
*H04N 5/232* (2006.01)
*G02B 13/18* (2006.01)
(Continued)

(52) U.S. Cl.
CPC .............. *H04N 5/265* (2013.01); *B60R 1/00* (2013.01); *G02B 3/02* (2013.01); *G02B 13/18* (2013.01);
(Continued)

(58) Field of Classification Search
CPC .......... G02B 13/18; G02B 3/02; G02B 13/04; G02B 3/04; G02B 7/30; H04N 5/2254;
(Continued)

(56) References Cited

U.S. PATENT DOCUMENTS

2010/0302647 A1 12/2010 Hirose
2011/0221767 A1* 9/2011 Kostrzewski ............ G02B 5/09
345/629
(Continued)

FOREIGN PATENT DOCUMENTS

JP 59-15239 1/1984
JP 2007-158578 6/2007
(Continued)

OTHER PUBLICATIONS

Patrice (Multi-task single lens for automotive vision applications—Proc. SPIE 7314, Photonics in the Transportation Industry: Auto to Aerospace II, 731409 (Apr. 29, 2009 (Year: 2009).*
(Continued)

*Primary Examiner* — Nasim N Nirjhar
(74) *Attorney, Agent, or Firm* — Renner, Otto, Boisselle & Sklar, LLP

(57) ABSTRACT

An imaging system includes: a first imaging apparatus including a first imaging element and a first optical system; and a generator that generates an image based on image data acquired from the first imaging element. The first optical system includes a first free-form surface lens that has a shape that allows an image to be formed on the first imaging element such that a resolution is different between a portion of a predetermined region and another portion of the predetermined region, the resolution being defined as a total number of imaging pixels that capture an image within a unit field angle on a horizontal plane.

14 Claims, 10 Drawing Sheets

(51) Int. Cl.
  *G06K 9/00* (2006.01)
  *H04N 7/18* (2006.01)
  *B60R 1/00* (2006.01)
  *H04N 5/247* (2006.01)
  *B60R 11/04* (2006.01)
  *H04N 5/225* (2006.01)

(52) U.S. Cl.
  CPC ..... *G06K 9/00791* (2013.01); *H04N 5/23232* (2013.01); *H04N 5/23238* (2013.01); *H04N 7/183* (2013.01); *B60R 11/04* (2013.01); *B60R 2300/10* (2013.01); *H04N 5/2254* (2013.01); *H04N 5/247* (2013.01); *H04N 7/18* (2013.01)

(58) Field of Classification Search
  CPC .......... G01C 3/10; G01C 11/02; G01C 11/30; G06T 7/55
  See application file for complete search history.

(56) References Cited

U.S. PATENT DOCUMENTS

| | | | |
|---|---|---|---|
| 2011/0285973 A1* | 11/2011 | Togino | G02B 13/08 353/98 |
| 2014/0114534 A1 | 4/2014 | Zhang et al. | |
| 2014/0247352 A1 | 9/2014 | Rathi et al. | |
| 2016/0044284 A1 | 2/2016 | Goseberg et al. | |
| 2016/0148062 A1 | 5/2016 | Fursich | |
| 2016/0165148 A1 | 6/2016 | Itoh | |
| 2018/0150949 A1* | 5/2018 | Matono | G01C 3/06 |

FOREIGN PATENT DOCUMENTS

| | | |
|---|---|---|
| JP | 2009-10906 | 1/2009 |
| JP | 2010-276755 | 12/2010 |
| JP | 2015-19271 | 1/2015 |
| JP | 2016-126254 | 7/2016 |
| WO | WO 2013/067083 A1 | 5/2013 |
| WO | WO 2013/074604 A2 | 5/2013 |

OTHER PUBLICATIONS

Extended European Search Report for corresponding European Application No. 17830825.0 dated Jul. 10, 2018.

Patrice Roulet et al., "Multi-task single lens for automotive vision applications", vol. 7314, XP055166773, May 1, 2009.

International Search Report (ISR) dated Aug. 15, 2017 in International (PCT) Application No. PCT/JP2017/024295.

* cited by examiner

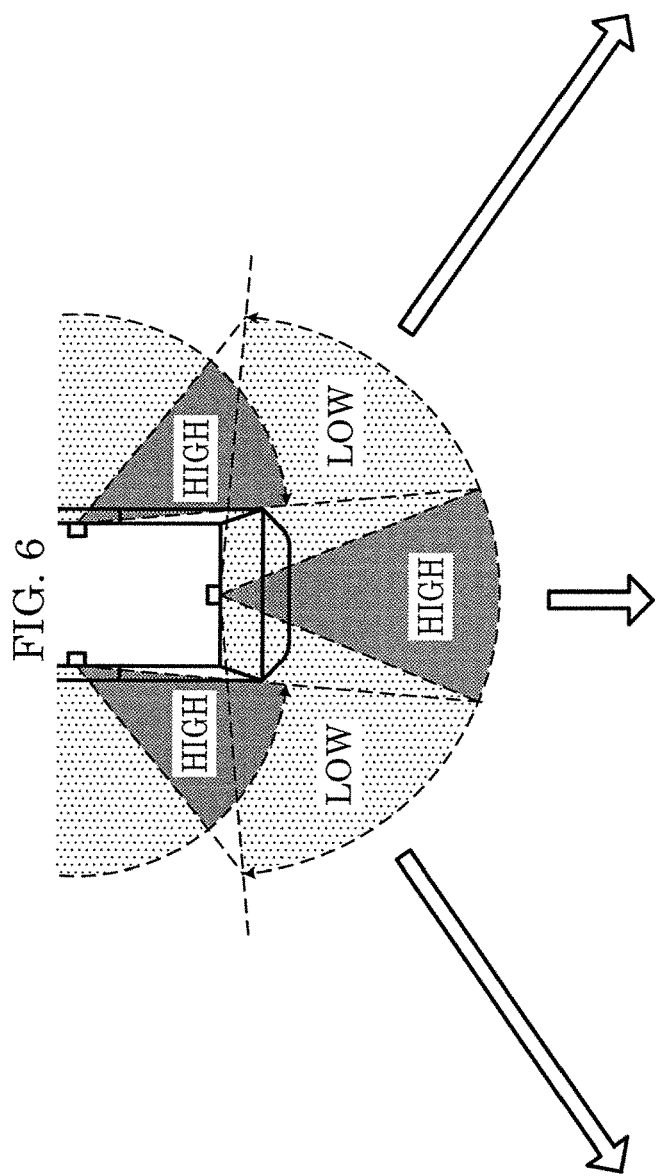
FIG. 6

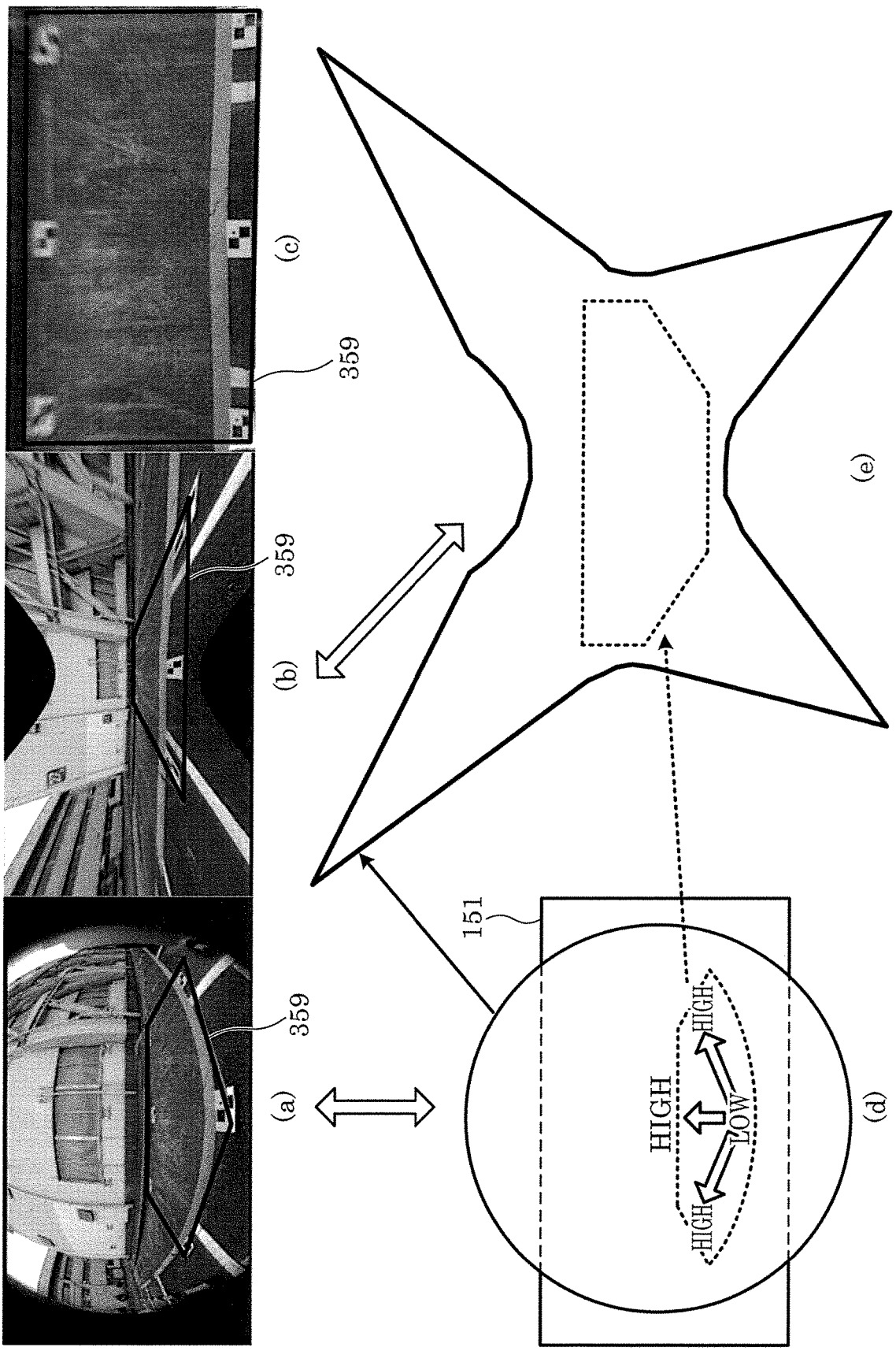

IMAGING SYSTEM, AND MOBILE SYSTEM

CROSS REFERENCE TO RELATED APPLICATIONS

This application is a U.S. continuation application of PCT International Patent Application Number PCT/JP2017/024295 filed on Jul. 3, 2017, claiming the benefit of priority of Japanese Patent Application Number 2016-144866 filed on Jul. 22, 2016, the entire contents of which are hereby incorporated by reference.

BACKGROUND

1. Technical Field

The present disclosure relates to an imaging system that generates an image of a predetermined region as image data, and a mobile system that includes the imaging system.

2. Description of the Related Art

Conventionally, a so-called top view technique or free view technique is known in which a plurality of imaging apparatuses are attached to an automobile, and images obtained from the plurality of imaging apparatuses are combined to produce an image that shows the surroundings of the automobile.

Japanese Unexamined Patent Application Publication No. 2015-19271 discloses a technique for an apparatus that combines images captured by a plurality of imaging apparatuses that are attached to a vehicle, the technique suppressing a reduction in the resolution of the combined image in the event of the occurrence of a malfunction in one of the imaging apparatuses.

SUMMARY

Recently, in a vehicle such as an automobile in particular, the rear-view mirror is replaced by display of an image captured by an imaging apparatus. However, the image used for that application is required to have a high resolution for people to easily view the image. However, as an imaging element for use in a vehicle, it is necessary to use a relatively low-resolution imaging element that is conventionally used to ensure a high level of reliability. An imaging apparatus that captures the full surrounding view of a vehicle by using such a relatively low-resolution imaging element may have an insufficient resolution. Accordingly, there is a need even for a relatively low-resolution imaging element to capture a high resolution image so as to display the image on a monitor as a replacement for the rear-view mirror.

Hereinafter, a disclosure will be given of an imaging system that can provide a high-resolution image of a necessary imaging region with only one imaging apparatus by using a free-form surface lens, and a mobile system that includes the imaging system.

An imaging system according to one aspect of the present disclosure includes: an imaging apparatus including an imaging element in which a plurality of imaging pixels are arranged in a matrix, and an optical system that forms an image of a predetermined region on an imaging surface of the imaging element; and a generator that generates an image based on image data acquired from the imaging element, wherein the optical system includes a free-form surface lens that has a shape that allows the image of the predetermined region to be formed on the imaging surface such that a resolution is different between a portion of the predetermined region and another portion of the predetermined region, the resolution being defined as a total number of the imaging pixels that capture an image within a unit field angle.

A mobile system according to one aspect of the present disclosure includes: an imaging apparatus including an imaging element in which a plurality of imaging pixels are arranged in a matrix, and an optical system that forms an image of a predetermined region on an imaging surface of the imaging element; a mobile body to which the imaging apparatus is attached and that moves in a space; a generator that generates an image based on image data acquired from the imaging element; and a display apparatus that displays the image of the predetermined region generated by the generator, wherein the optical system includes a free-form surface lens that has a shape that allows the image of the predetermined region to be formed on the imaging surface of the imaging element such that a resolution is different between a portion of the predetermined region and another portion of the predetermined region, the resolution being defined as a total number of the imaging pixels that capture an image within a unit field angle.

As described above, with the imaging system and the mobile system according to the present disclosure, it is possible to obtain both a high resolution image and a low resolution image with one imaging apparatus by using a free-form surface lens.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a diagram showing image data of the rear of a mobile body generated by a generator according to Embodiment 1;

FIG. 11 is a diagram showing, stepwise, images that are generated by a generator according to Embodiment 2.

DETAILED DESCRIPTION OF THE EMBODIMENTS

Next, imaging systems and mobile systems according to embodiments of the present disclosure will be described with reference to the drawings. The embodiments given below are merely examples of the imaging system and the mobile system according to the present disclosure. Accordingly, the scope of the present disclosure is defined by wording in the appended claims with reference to the embodiments given below, and is not limited to the embodiments given below. Thus, among the structural elements described in the following embodiments, structural elements that are not recited in any one of the independent claims of the present disclosure are described as structural elements that are not necessarily required to address the problem of the present disclosure, but constitute preferred embodiments.

In addition, the diagrams are schematic representations in which emphasis, omission, and scaling adjustment are applied as appropriate for the sake of the present disclosure, and thus are not necessarily true to the actual shape, positional relationship, and scale.

Embodiment 1

Figure 1:
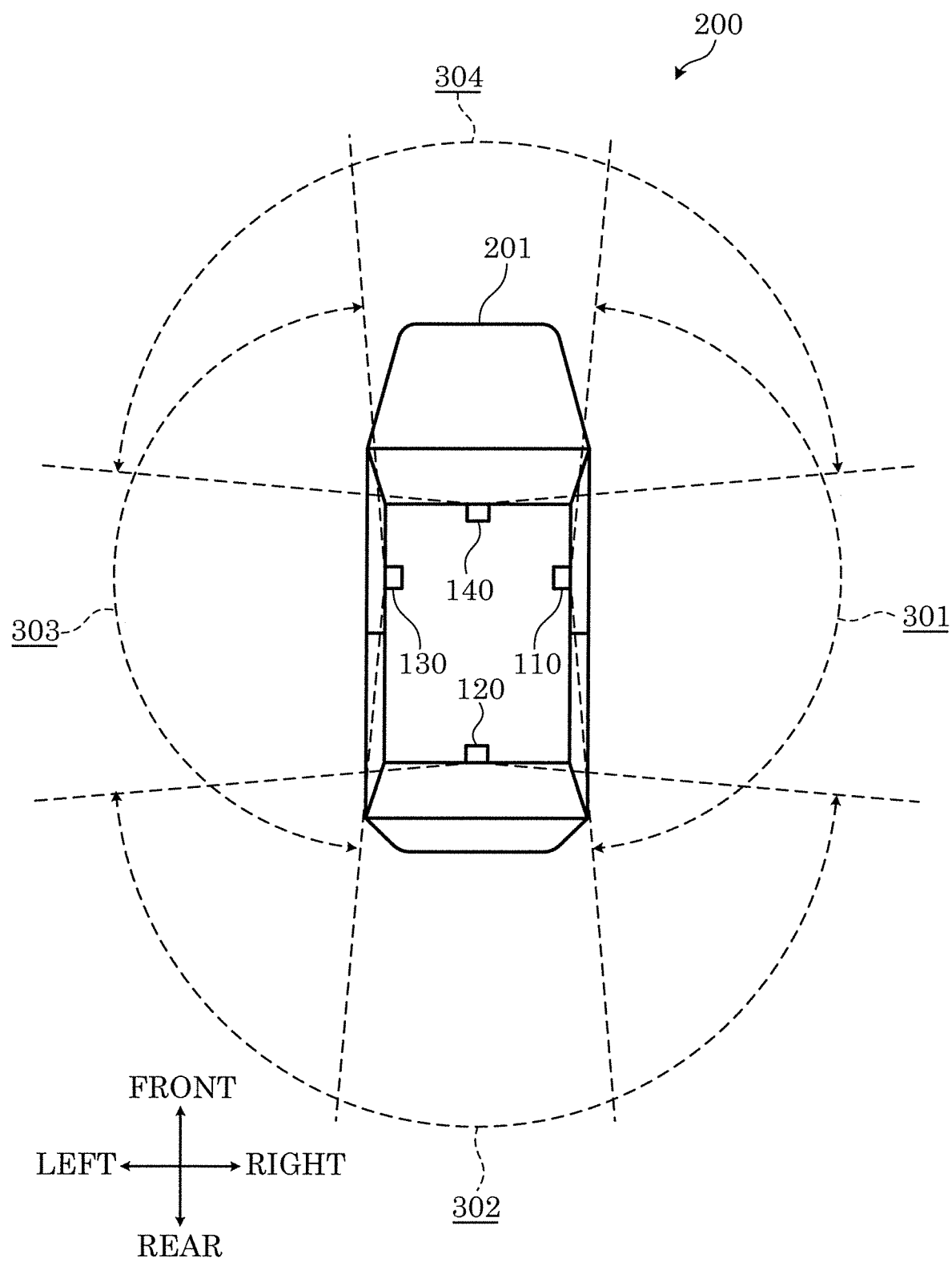
FIG. 1 is a diagram showing imaging regions of a plurality of imaging apparatuses that are attached to a vehicle according to Embodiment 1 as viewed in a horizontal plane.

FIG. 1 is a diagram showing imaging regions of a plurality of imaging apparatuses that are attached to a vehicle as viewed in a horizontal plane.

Figure 2:
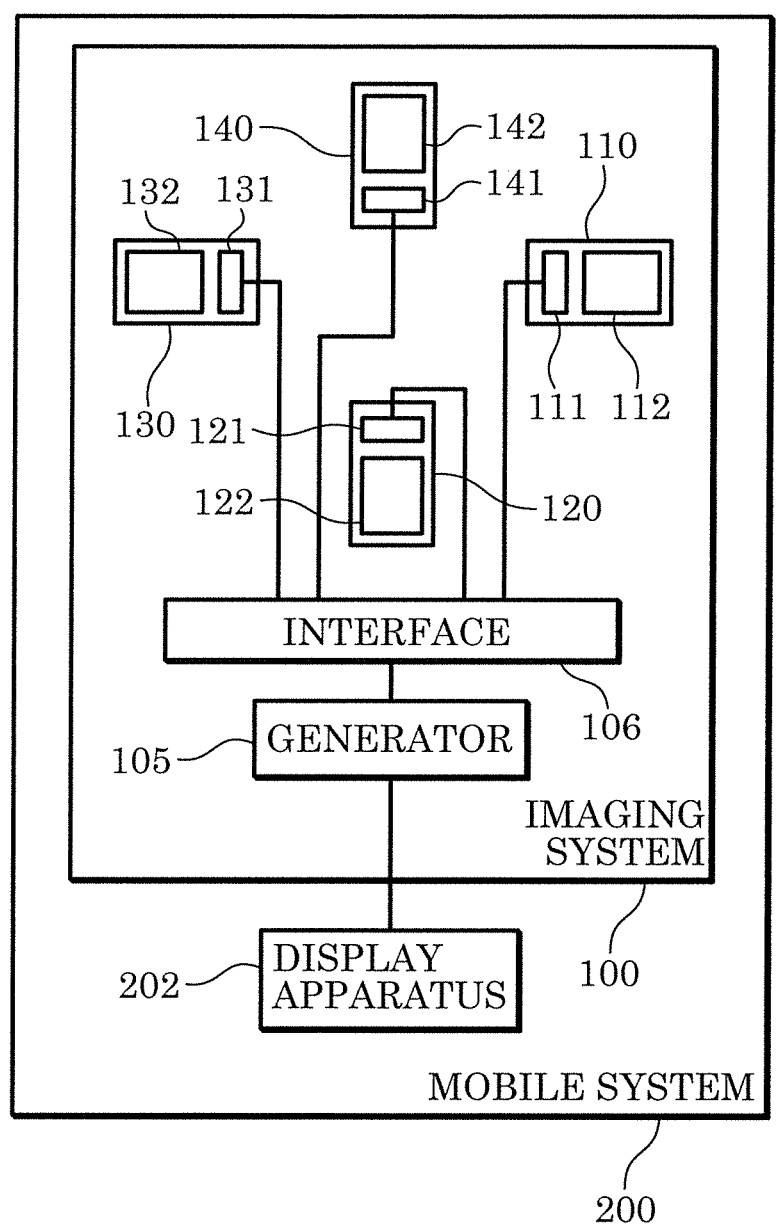
FIG. 2 is a block diagram showing a mechanism portion and a functional portion of a mobile system according to Embodiment 1.

FIG. 2 is a block diagram showing a mechanism portion and a functional portion of a mobile system.

As shown in the diagrams, mobile system 200 is a system that includes imaging system 100 and is capable of displaying an image of a region in a predetermined direction around a mobile body. Mobile system 200 includes mobile body 201, imaging apparatuses, generator 105, and display apparatus 202. In the case of Embodiment 1, the imaging apparatuses include first imaging apparatus 110, second imaging apparatus 120, third imaging apparatus 130, and fourth imaging apparatus 140.

Mobile Body 201

Mobile body 201 is an apparatus to which the imaging apparatuses are attached and that moves in a space. In the case of Embodiment 1, mobile body 201 is a vehicle such as an automobile that can carry people and move on a road.

Imaging Apparatus

Each of the imaging apparatuses is an apparatus that can convert an image of a predetermined region to image data, and includes an imaging element and an optical system. In the case of Embodiment 1, imaging system 100 of mobile system 200 includes first imaging apparatus 110, second imaging apparatus 120, third imaging apparatus 130, and fourth imaging apparatus 140 as the imaging apparatuses.

Imaging Element

The imaging element is a so-called imaging sensor such as, for example, a CMOS or a CCD that is an element that can convert an image optically formed on an imaging surface to image data by using a plurality of imaging pixels that are arranged in a matrix. In the case of Embodiment 1, the imaging apparatuses respectively include first imaging element 111, second imaging element 121, third imaging element 131, and fourth imaging element 141 as imaging elements.

Optical System

The optical system is an apparatus that forms an image of a predetermined region on an imaging surface of the imaging element, and includes a combination of a plurality of lenses, apertures, filters, and the like. Also, at least one of the plurality of lenses included in the optical system is a free-form surface lens. In the case of Embodiment 1, the imaging apparatuses respectively include first optical system 112, second optical system 122, third optical system 132, and fourth optical system 142 as optical systems.

Hereinafter, the optical system will be described specifically by taking second optical system 122 as an example.

Figure 3:
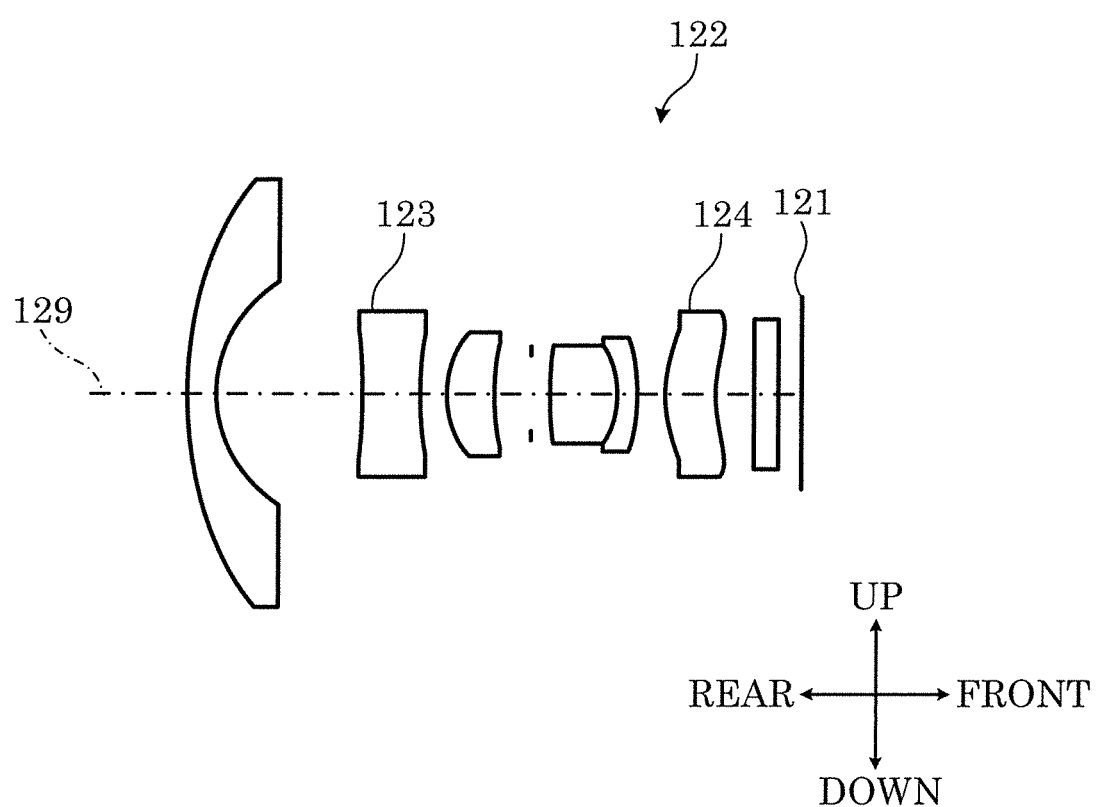
FIG. 3 is a configuration diagram of a second optical system according to Embodiment 1 as viewed in a cross section taken along an imaginary vertical plane including a second optical axis.

FIG. 3 is a configuration diagram of a second optical system as viewed in a cross section taken along an imaginary vertical plane including a second optical axis.

FIG. 3 is a configuration diagram of a second optical system as viewed in a cross section taken along an imaginary vertical plane including a second optical axis.

Figure 4:
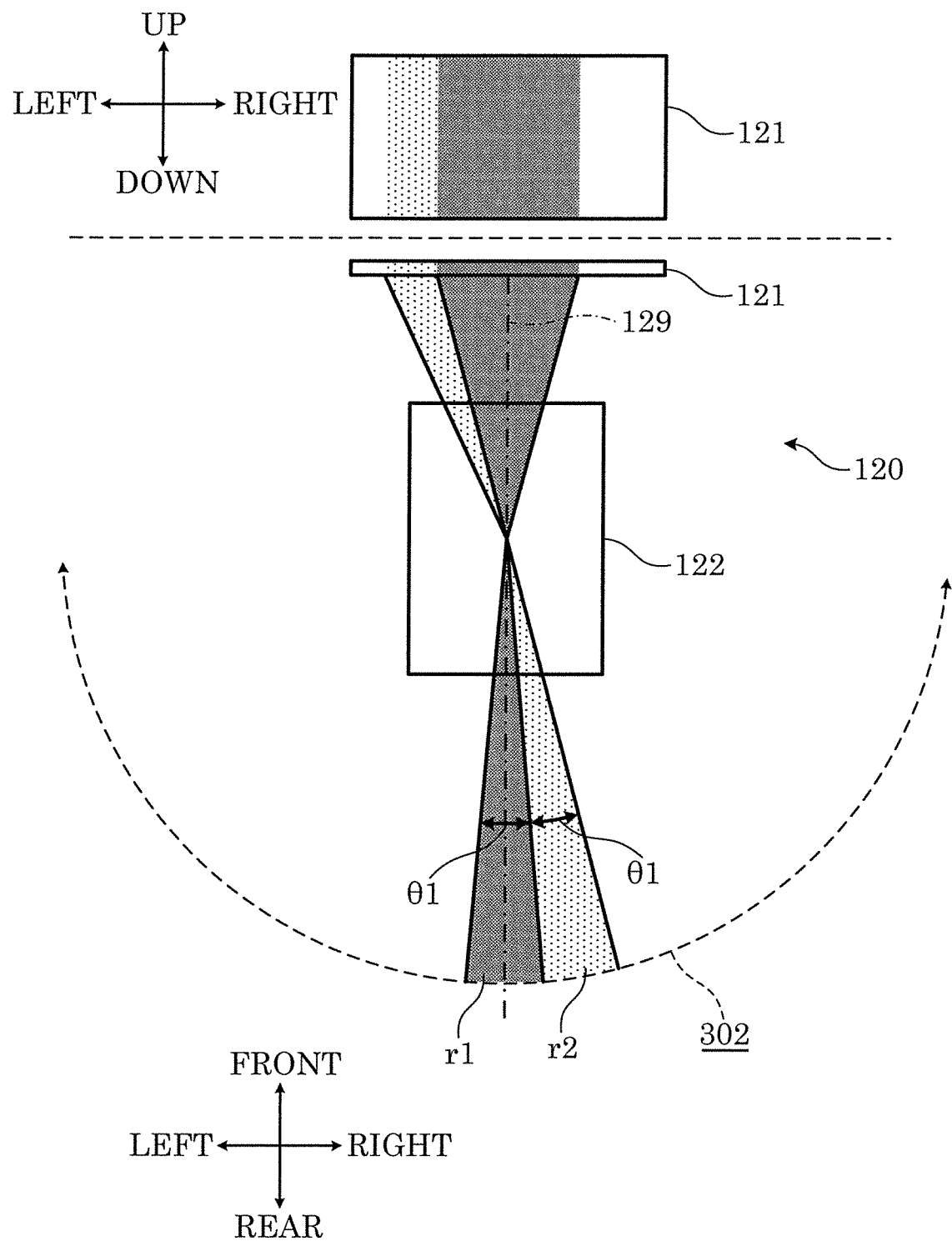
FIG. 4 is a diagram illustrating resolution by using the second optical system according to Embodiment 1.

FIG. 4 is a diagram illustrating resolution by using the second optical system according to Embodiment 1.

As shown in the diagrams, second optical system 122 is an apparatus that forms an image of a predetermined region on an imaging surface of second imaging element 121. Also, in second optical system 122, second free-form surface lenses 123 and 124 have a shape that allows an image to be formed on second imaging element 121 such that the resolution of a central portion that is a part of second region 302 (see FIG. 1) is higher than the resolution of end portions of second region 302 as viewed in a cross-section taken along a plane (horizontal plane) including second optical axis 129 and a first axis (right left axis in the diagram) perpendicular to second optical axis 129.

As used herein, the optical axis refers to, in principle, an imaginary line that passes through the center (middle) of the imaging surface of the imaging element and is vertical to the imaging surface. In the case where the optical system includes a mirror, a prism or the like that reflects light, the optical axis is bent by reflection.

As used herein, the term "resolution" refers to the number of imaging pixels that capture an image within a unit field angle. To be specific, for example, as shown in FIG. 4, first partial region r1 (dark portion) including second optical axis 129 and second partial region r2 that is adjacent to first partial region r1 have the same field angle of θ1. However, with respect to the length of the image formed on the imaging surface of second imaging element 121 as viewed in the horizontal plane, the image corresponding to first partial region r1 is longer than the image corresponding to second partial region r2. On the other hand, second imaging element 121 includes imaging pixels that are equidistantly spaced. Accordingly, in the case where the field angle is the same, among the images corresponding to these partial regions, the image captured with a greater number of imaging pixels has a higher resolution.

The expression "resolution is different" and other similar expressions refer to a difference in resolution generated by a combination of an optical system composed mainly of a spherical lens and a planar imaging element, or in other words, a difference that is greater than the difference between the resolution of a vicinity of the optical axis and the resolution of a portion farthest from the optical axis.

Also, the term "free-form surface lens" refers to a lens whose surface that refracts light so as to form an image is non-arcuate and is not rotationally symmetric. A cylindrical lens, as a type of an arcuate lens, is also defined as a lens different from the free-form surface lens. As the free-form surface lens, for example, as shown in FIG. 3, second free-form surface lens 123 has a non-arcuate shape in which the shape of a cross section taken along an imaginary plane (horizontal plane) including second optical axis 129 and the first axis (right left axis) and the shape of a cross section taken along an imaginary plane (vertical plane) including second optical axis 129 and a second axis (up down axis) perpendicular to the first axis are different, and that is not a part of a perfect circle.

There is no particular limitation on the material of the free-form surface lens, and it is possible to use, for example, glass, resin or the like. Also, there is no particular limitation on the method for producing a free-form surface lens. It is possible to use, for example, a production method in which a free-form surface lens is molded by using a mold such as a metal mold.

Generator 105

Generator 105 is a processor that generates one or more images based on image data acquired from the imaging element of an imaging apparatus via interface 106, and has a function of storing shape data indicating the shape of the free-form surface lens included in the optical system of the imaging apparatus, and applying a correction to a generated image based on the shape data so as to bring the image closer to an image obtained when the free-form surface lens is not used, or in other words, the actual image. Also, generator 105 may have a function of, when image data is acquired from a plurality of imaging elements, combining the images based on a plurality of image data, clipping necessary portions, and generating one or more combined images.

Generator 105 may be implemented by dedicated hardware or by a program executor such as an arithmetic element reading a software program recorded in a hard disk, a semiconductor memory, or the like and executing the software program.

Description of Each Imaging Apparatus

Next, each of first imaging apparatus 110, second imaging apparatus 120, third imaging apparatus 130, and fourth imaging apparatus 140 that are attached to mobile body 201 will be described.

First imaging apparatus 110 is attached to a right side portion of mobile body 201 so as to capture an image in the right direction of mobile body 201. First imaging apparatus 110 includes first imaging element 111, and first optical system 112 that forms, on an imaging surface of first imaging element 111, an image of first region 301 that is on the right side of mobile body 201.

Second imaging apparatus 120 is attached to a rear portion of mobile body 201 so as to capture an image in the rear direction of mobile body 201. Second imaging apparatus 120 includes second imaging element 121, and second optical system 122 that forms, on an imaging surface of second imaging element 121, an image of second region 302 that is on the rear side of mobile body 201.

Third imaging apparatus 130 is attached to a left side portion of mobile body 201 so as to capture an image in the left direction of mobile body 201. Third imaging apparatus 130 includes third imaging element 131, and third optical system 132 that forms, on an imaging surface of third imaging element 131, an image of third region 303 that is on the left side of mobile body 201.

Fourth imaging apparatus 140 is attached to a front portion of mobile body 201 so as to capture an image in the front direction of mobile body 201. Fourth imaging apparatus 140 includes fourth imaging element 141, and fourth optical system 142 that forms, on an imaging surface of fourth imaging element 141, an image of fourth region 304 that is on the front side of mobile body 201.

Here, first region 301 partially overlaps fourth region 304 and second region 302. Second region 302 partially overlaps first region 301 and third region 303. Third region 303 partially overlaps second region 302 and fourth region 304. Fourth region 304 partially overlaps third region 303 and first region 301. With this configuration, mobile system 200 and imaging system 100 can generate an image that shows the full surroundings of mobile body 201. There is no particular limitation on the full field angle in the horizontal plane of each imaging apparatus, but the full field angle is about 180°. In addition, each imaging apparatus also has a field of view in the vertical plane, and the full field angle in the vertical plane is, for example, about 150°.

Description of Each Imaging Element

In the case of Embodiment 1, first imaging element 111, second imaging element 121, third imaging element 131, and fourth imaging element 141 that are respectively included in the imaging apparatuses are the same type of imaging sensors.

Description of Each Optical System

Figure 5:
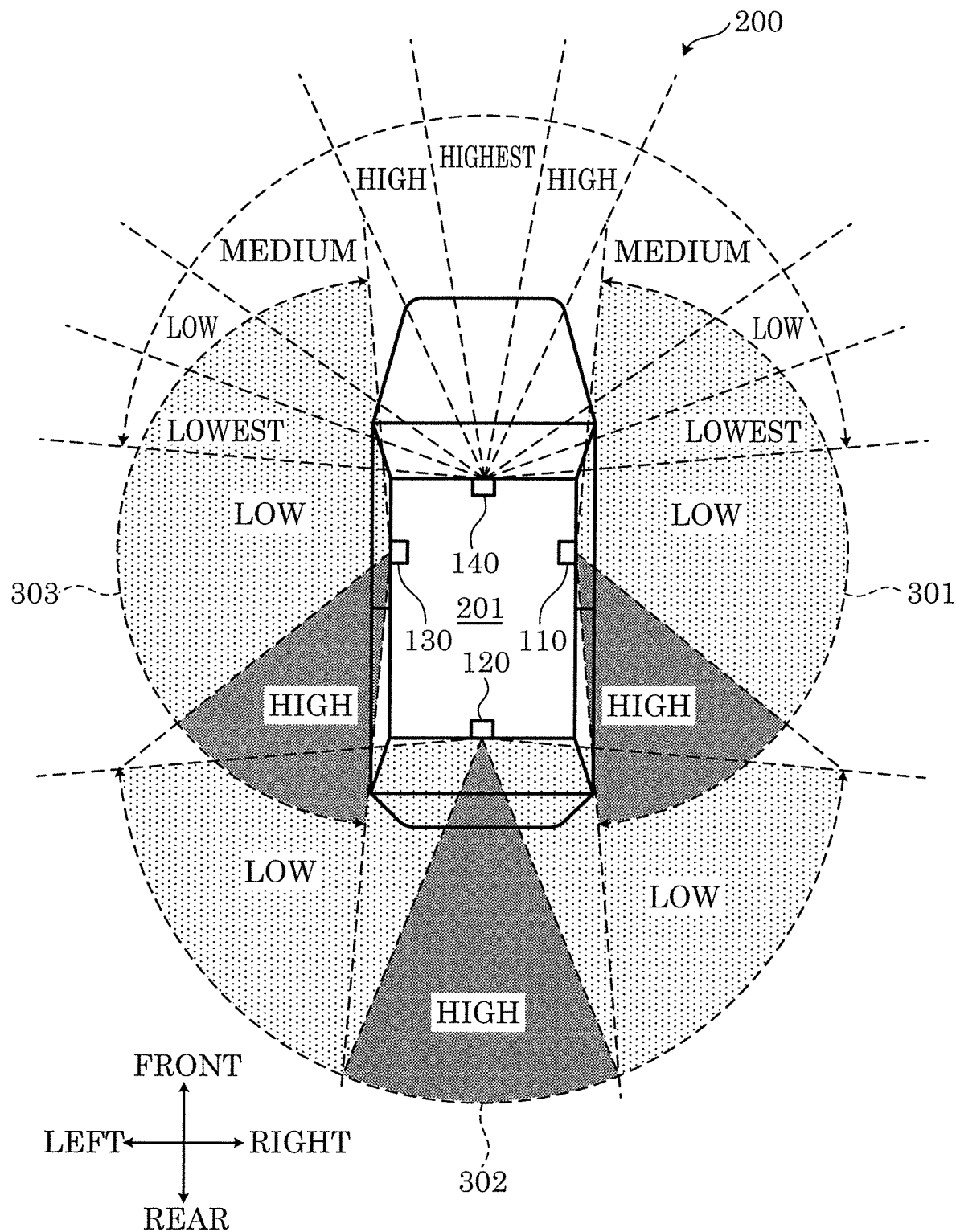
FIG. 5 is a diagram showing resolution levels based on free-form surface lenses according to Embodiment 1.

As shown in FIG. 5, first optical system 112 includes a first free-form surface lens having a shape that allows an image to be formed on the imaging surface of first imaging element 111 such that the resolution of an overlapping portion with second region 302 is higher than the resolution of the other portion of first region 301. However, the high-resolution portion of first region 301 may be set to be larger than the overlapping portion with second region 302.

As shown in FIG. 5, second optical system 122 includes second free-form surface lens 123 having a shape that allows an image to be formed on the imaging surface of second imaging element 121 such that the resolution of portions that do not overlap first region 301 and third region 303 is higher than the resolution of portions that overlap first region 301 and third region 303.

As shown in FIG. 5, third optical system 132 includes a third free-form surface lens having a shape that allows an image to be formed on third imaging element 131 such that the resolution of a portion of third region 303 that overlaps second region 302 is higher than the resolution of the other portion of third region 303. However, the high-resolution portion of third region 303 may be set to be larger than the overlapping portion with second region 302.

As shown in FIG. 5, fourth optical system 142 includes a fourth free-form surface lens having a shape that allows an image to be formed on fourth imaging element 141 such that the resolution decreases stepwise toward the sides, with the central portion having the highest resolution.

Generator

In the case of Embodiment 1, generator 105 acquires image data of the overlapping portion of first region 301 with second region 302 from first imaging element 111, and acquires image data of the overlapping portion of third region 303 with second region 302 from third imaging element 131. Then, generator 105 combines these acquired image data with image data of a high-resolution portion acquired from second imaging element 121, and generates image data showing the rear of mobile body 201 as shown in FIG. 6. The combined image obtained in the manner described above is an image showing the rear of mobile body 201, the image having a high resolution over an entire area from one end to the other end in the right left direction of the rear of mobile body 201.

Furthermore, generator 105 performs distortion correction and viewpoint transformation processing on the image data acquired from first imaging element 111, second imaging element 121, third imaging element 131, and fourth imaging element 141, thereafter performs position adjustment based on the image data of overlapping portions where adjacent regions overlap, and generates a combined image showing a full surround view of mobile body 201. In this way, a so-called top-view image can be obtained.

As described above, with imaging system 100 and mobile system 200 according to Embodiment 1, a top-view image can be formed by using four imaging apparatuses, and the rear of mobile body 201 can be displayed with a high-resolution image.

Display apparatus 202 is an apparatus that displays an image generated by generator 105. In the case of Embodiment 1, display apparatus 202 is attached to a position visible for the driver of mobile body 201 in the interior of mobile body 201. Furthermore, display apparatus 202 includes a first display apparatus (not shown) and a second display apparatus (not shown). The first display apparatus displays a high-resolution image showing the rear of mobile body 201, and the second display apparatus displays, at the time of parking, for example, a so-called top-view image that shows a virtual image of mobile body 201 together with the full surroundings of mobile body 201. With this configuration, it is possible to provide assistance for parking mobile body 201 by using four imaging apparatuses, and it is also possible to provide assistance for a lane change while mobile body 201 is traveling.

Embodiment 2

Next, an imaging system and a mobile system according to another embodiment will be described. The structural elements (portions) that perform operations and functions that are the same as or similar to those of Embodiment 1 described above and the structural elements (portions) that have shapes, mechanisms and structures that are the same as or similar to those described above will be given the same reference numerals, and a description may be omitted. Also, the present embodiment will be described focusing on differences from Embodiment 1, and a description of the same may be omitted.

Figure 9:
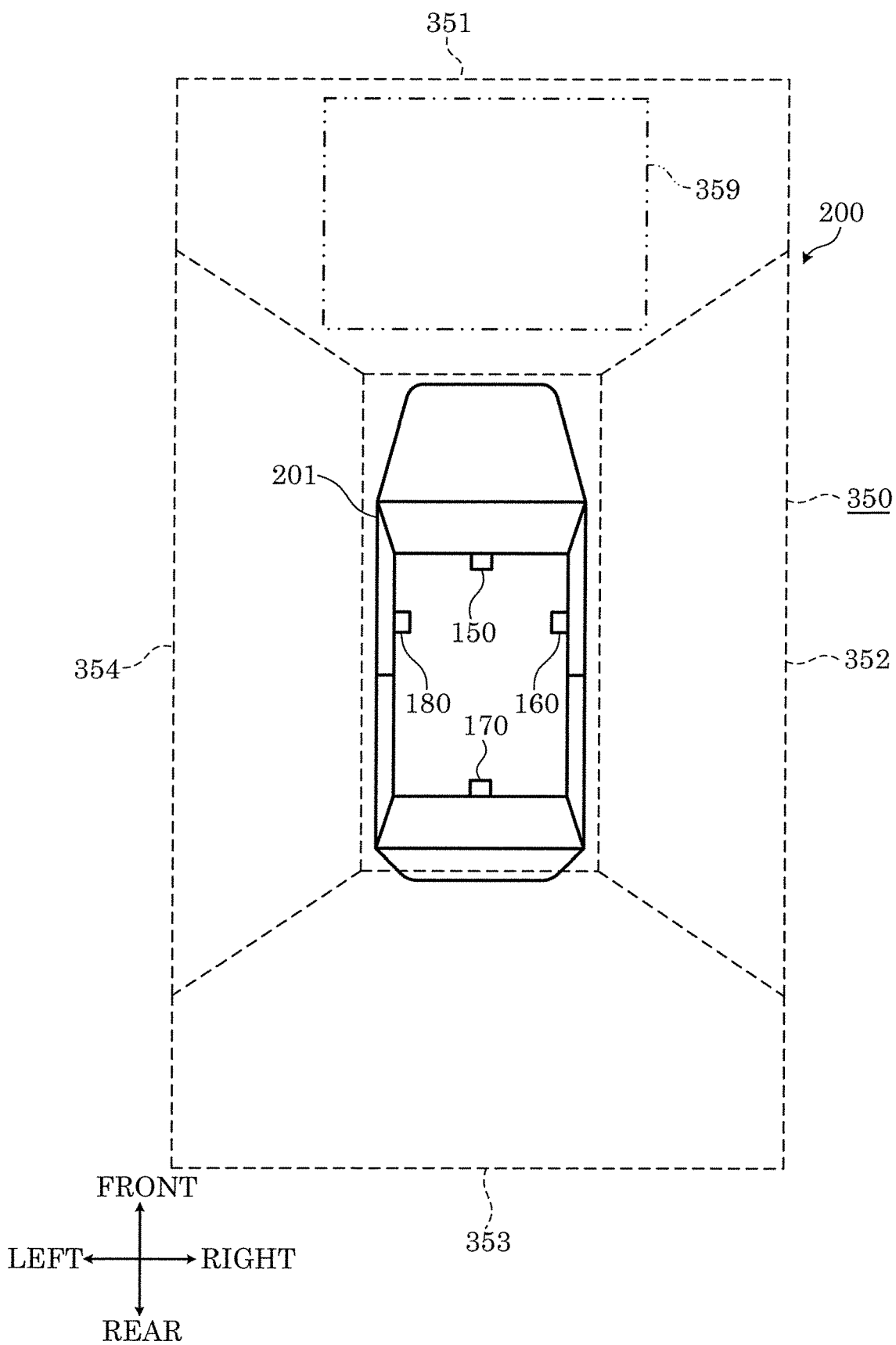
FIG. 9 is a diagram showing imaging regions of a plurality of imaging apparatuses that are attached to a vehicle according to Embodiment 2.

FIG. 9 is a diagram showing imaging regions of a plurality of imaging apparatuses that are attached to a vehicle according to Embodiment 2 as viewed in the horizontal plane.

Figure 10:
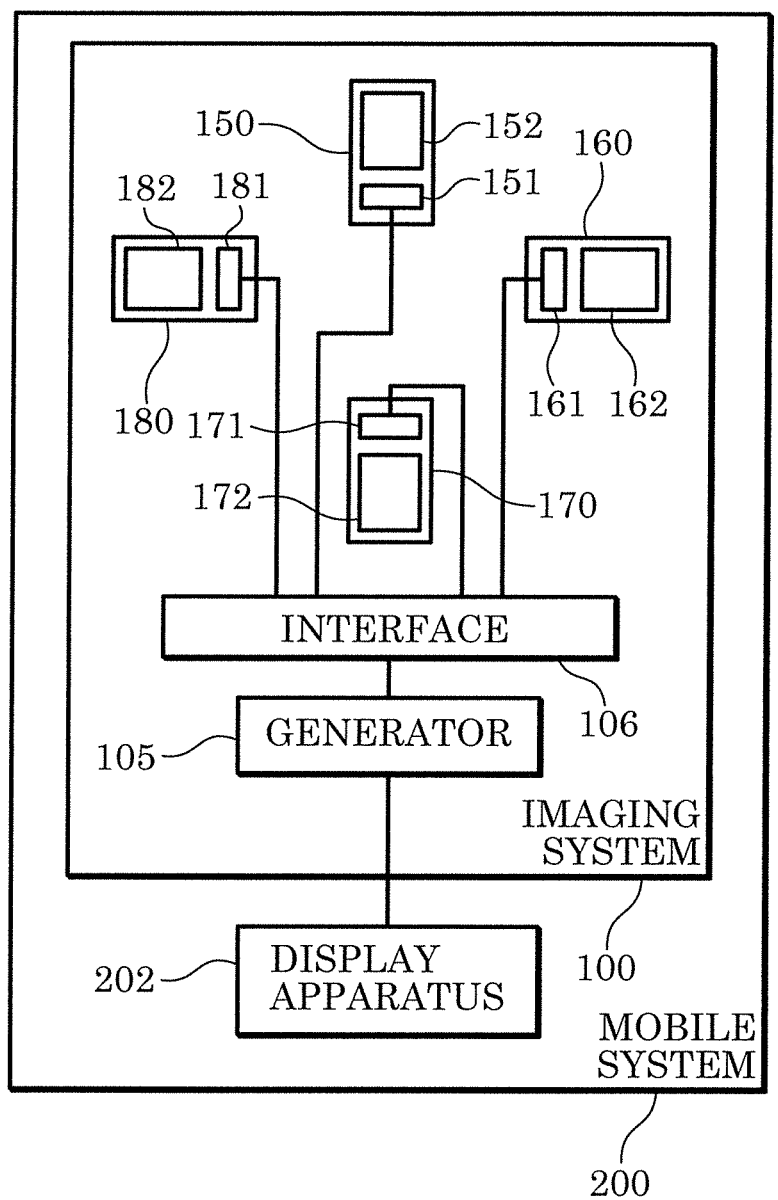
FIG. 10 is a block diagram showing a mechanism portion and a functional portion of a mobile system according to Embodiment 2.

FIG. 10 is a block diagram showing a mechanism portion and a functional portion of a mobile system according to Embodiment 2.

As shown in the diagrams, mobile system 200 is a system that includes imaging system 100 and is capable of displaying an image of a region in a predetermined direction around a mobile body. Mobile system 200 includes mobile body 201, imaging apparatuses, generator 105, and display apparatus 202.

Imaging Apparatus

Each of the imaging apparatuses is an apparatus that can convert an image of a predetermined region to image data, and includes an imaging element and an optical system. In the case of Embodiment 2, imaging system 100 of mobile system 200 includes fifth imaging apparatus 150, sixth imaging apparatus 160, seventh imaging apparatus 170, and eighth imaging apparatus 180 as the imaging apparatuses.

Imaging Element

The imaging element is a so-called imaging sensor such as, for example, a CMOS or a CCD that is an element that can convert an image optically formed on an imaging surface to image data by using a plurality of imaging pixels that are arranged in a matrix. In the case of Embodiment 2, the imaging apparatuses respectively include fifth imaging element 151, sixth imaging element 161, seventh imaging element 171, and eighth imaging element 181 as imaging elements.

Optical System

The optical system is an apparatus that forms an image of a predetermined region on an imaging surface of the imaging element, and includes a combination of a plurality of lenses, apertures, filters, and the like. Also, at least one of the plurality of lenses included in the optical system is a free-form surface lens. In the case of Embodiment 2, the imaging apparatuses respectively include fifth optical system 152, sixth optical system 162, seventh optical system 172, and eighth optical system 182 as optical systems.

Hereinafter, the optical system will be described specifically by taking fifth optical system 152 as an example.

Fifth optical system 152 is an apparatus that forms an image of a predetermined region on an imaging surface of fifth imaging element 151. In particular, fifth optical system 152 is disposed such that an image of first planar region 351 that is provided in parallel or substantially parallel to the optical axis of fifth optical system 152 is formed on the imaging surface of fifth imaging element 151.

In the case of the present embodiment, first planar region 351 is a partial region of a planar surface such as a road on which mobile body 201 that is an automobile travels, or a parking lot, the region including a linear portion in at least a part of the peripheral edge. Each planar region may have a polygonal shape. To be specific, first planar region 351 and third planar region 353 have a hexagonal shape, and second planar region 352 and fourth planar region 354 have a trapezoidal shape.

Fifth optical system 152 includes a fifth free-form surface lens that allows an image to be formed on fifth imaging element 151 such that the resolution of a portion of first planar region 351 that is far from fifth optical system 152 is higher than the resolution of a portion of first planar region 351 that is close to fifth optical system 152. Also, fifth optical system 152 is configured to be capable of forming an image on fifth imaging element 151 such that, in first planar region 351, a region that is close to a boundary area with at least one of second planar region 352 and fourth planar region 354 has a high resolution. As used herein, the expression "high resolution" means that the resolution may vary stepwise from a low point to a high point, or may vary continuously. It is also possible to combine a portion where the resolution varies stepwise and a portion where the resolution varies continuously.

Generator 105

Generator 105 is a processor that generates one or more images based on image data acquired from the imaging elements of the imaging apparatuses via interface 106, and has a function of bringing corresponding portions of images closer to the actual shapes of first planar region 351, second planar region 352, third planar region 353, and fourth planar region 354. Also, generator 105 has a function of acquiring a plurality of image data from the plurality of imaging elements, combining the images based on the plurality of image data, and generating a combined image that shows the surroundings of mobile body 201 by reproducing the actual arrangement of first planar region 351, second planar region 352, third planar region 353, and fourth planar region 354. In particular, a high resolution is set in the vicinity of each boundary between regions, and thus generator 105 performs stitching by using image data of the high-resolution portions so as to suppress image degradation of seam portions in the combined image.

Description of Each Imaging Apparatus

Next, each of fifth imaging apparatus 150, sixth imaging apparatus 160, seventh imaging apparatus 170, and eighth imaging apparatus 180 that are attached to mobile body 201 will be described.

Fifth imaging apparatus 150 is attached to a front portion of mobile body 201 so as to capture an image in the front direction of mobile body 201. Fifth imaging apparatus 150 includes fifth imaging element 151, and fifth optical system 152 that forms, on the imaging surface of fifth imaging element 151, an image of first planar region 351 that is a part of rectangular annular region 350 that is virtually set so as to surround mobile body 201 on a plane on which mobile body 201 travels.

Sixth imaging apparatus 160 is attached to a right side portion of mobile body 201 so as to capture an image in the right direction of mobile body 201. Sixth imaging apparatus 160 includes sixth imaging element 161, and sixth optical system 162 that forms, on an imaging surface of sixth imaging element 161, an image of second planar region 352 that is a region of annular region 350 that is different from first planar region 351, and makes line contact with first planar region 351.

Seventh imaging apparatus 170 is attached to a rear portion of mobile body 201 so as to capture an image in the back direction of mobile body 201. Seventh imaging apparatus 170 includes seventh imaging element 171, and seventh optical system 172 that forms, on an imaging surface of seventh imaging element 171, an image of third planar region 353 that is a region of annular region 350 that is different from first planar region 351 and second planar region 352, and makes line contact with second planar region 352.

Eighth imaging apparatus 180 is attached to a left side portion of mobile body 201 so as to capture an image in the left direction of mobile body 201. Eighth imaging apparatus 180 includes eighth imaging element 181, and eighth optical system 182 that forms, on an imaging surface of eighth imaging element 181, an image of fourth planar region 354 that is a region of annular region 350 that is different from first planar region 351, second planar region 352, and third planar region 353, and makes line contact with first planar region 351 and third planar region 353.

Here, first planar region 351, second planar region 352, third planar region 353, and fourth planar region 354 form annular region 350, and adjacent planar regions do not overlap. However, an image formed on each imaging element may have a partial overlap.

Operations, Etc

Next, the actions and operations of imaging system 100 will be described by taking rectangular region 359 shown in FIG. 9 as an example.

FIG. 11 is a diagram showing image data obtained by the imaging apparatus when fifth optical system 152 is attached to mobile body 201 at a depression angle of 0 degrees, and illustrative representations showing, stepwise, images obtained by the generator.

Fifth optical system 152 has a property of capturing rectangular region 359 shown in FIG. 9, which is a virtually set region, so as to have a polygonal shape as shown in the image (a) in FIG. 11. Also, fifth optical system 152 includes a first free-form surface lens having a shape that allows an image to be formed on the imaging surface of fifth imaging element 151 such that the resolution of a portion of rectangular region 359 far from fifth imaging apparatus 150 is higher than the resolution of a portion of rectangular region 359 close to fifth imaging apparatus 150. To be specific, the resolution of a vicinity of a line segment extending along a boundary area between a road surface and a building, or in other words, an intermediate portion of the image is higher than the resolution of a vicinity of two line segments that form a vertex angle at a lower end portion of the polygonal shape shown in (a) in FIG. 11. Also, in the vicinity of the line segment extending along the boundary area between the road surface and the building, the resolution is higher at the center portion than at both side portions. The resolution levels are schematically shown in (d) in FIG. 11. The circle shown in (d) in FIG. 11 indicates the entire image obtained by fifth optical system 152. The rectangular portion indicates fifth imaging element 151. The portions indicated by "high" have a resolution relatively higher than the portions indicated by "low". The arrows pointing from "low" to "high" indicate that the resolution is increasing gradually. In the diagram, "high" is shown in a plurality of locations, but it does not mean that the locations indicated by "high" have the same resolution.

The same applies to sixth optical system 162, seventh optical system 172, and eighth optical system 182.

Generator 105 stores optical data of fifth optical system 152 as typified by distortion data and shape data indicating the shape of the free-form surface lens included in fifth optical system 152 of fifth imaging apparatus 150, and applies a correction to image data obtained from fifth imaging element 151 so as to correct distortion as shown in (b) and (e) in FIG. 11.

Next, an image as shown in (c) in FIG. 11 is generated in which the shape of rectangular region 359 is reproduced, or in other words, an image as viewed from a normal direction of rectangular region 359 through viewpoint transformation. That is, distortion correction is performed on the image (a) in FIG. 11 so as to obtain the image (b) in FIG. 11, and thereafter viewpoint transformation is performed to obtain the image (c) in FIG. 11. (e) in FIG. 11 schematically shows a state in which rectangular region 359 is enlarged, and distortion correction and viewpoint transformation are simultaneously performed.

As described above, in order to reproduce the shape of rectangular region 359, the enlargement magnification is gradually increased from a portion close to fifth imaging apparatus 150 to a portion far from fifth imaging apparatus 150 (from the bottom to top in (a) and (d) in FIG. 11), but the resolution increases gradually from the portion close to fifth imaging apparatus 150 to the portion far from fifth imaging apparatus 150 (from the bottom to intermediate portion in (a) and (d) in FIG. 11). Accordingly, the resulting image has a uniform resolution as a whole. The same applies to sixth optical system 162, seventh optical system 172, and eighth optical system 182.

In the case of the present embodiment, annular region 350 surrounding mobile body 201 is divided into a plurality of regions, and the regions are captured by corresponding imaging apparatuses. Generator 105 reproduces the shape of each region based on the image data acquired from each imaging element, reproduces the position of each region so as to show the full surroundings of mobile body 201, and combines them so as to generate a combined image. At this time, image data of a region corresponding to a boundary area between first planar region 351, second planar region 352, third planar region 353, and fourth planar region 354 that form annular region 350 has a high resolution, which also contributes to generation of a combined image with high accuracy. With this configuration, it is possible to obtain a high-quality top-view image that has a uniform resolution and high accuracy.

As described above, with imaging system 100 and mobile system 200 according to Embodiment 2, it is possible to form a top-view image having a uniform resolution by using a plurality of imaging apparatuses.

Also, by displaying the image generated by generator 105 on display apparatus 202 that is provided in the interior of mobile body 201 as a top-view image, the driver and the like can see the image of the surroundings of mobile body 201 when parking mobile body 201 without a sense of discomfort.

The present disclosure is not limited to the embodiments given above. Other embodiments obtained by any combination of the structural elements described in this specification as well as other embodiments implemented by excluding some of the structural elements may also be encompassed as embodiments of the present disclosure. The present disclosure also encompasses variations obtained by making various modifications that can be conceived by a person having ordinary skill in the art to the embodiments given above within the scope of the present disclosure, or in other words, without departing from the meaning indicated by wording in the appended claims.

For example, an example was described in which the free-form surface lens has such a shape that causes the resolution to vary stepwise between an overlapping portion between regions and a non-overlapping portion, but the present disclosure is not limited thereto. For example, the free-form surface lens may have a shape that causes the resolution to increase gradually from one end to the other end of the region. Also, in the embodiments described above, focus is given only to a difference in resolution in the horizontal plane, but the free-form surface lens may have not only a shape that causes the resolution in the horizontal plane to vary, but also a shape that causes the resolution in the vertical plane to vary. For example, in the case of mobile body 201 that travels on the ground, a portion corresponding to an elevation angle that is greater than or equal to a predetermined angle, and a portion corresponding to a depression angle that is greater than or equal to a predetermined angle are the sky and a road surface, and thus a free-form surface lens that has a shape that reduces resolution may be used.

Also, in the case where mobile body 201 is configured to move in the air and capture images under the mobile body such as a drone, a free-form surface lens that has a shape that increases the resolution of a portion corresponding to a depression angle that is greater than or equal to a predetermined angle may be used.

Figure 7:
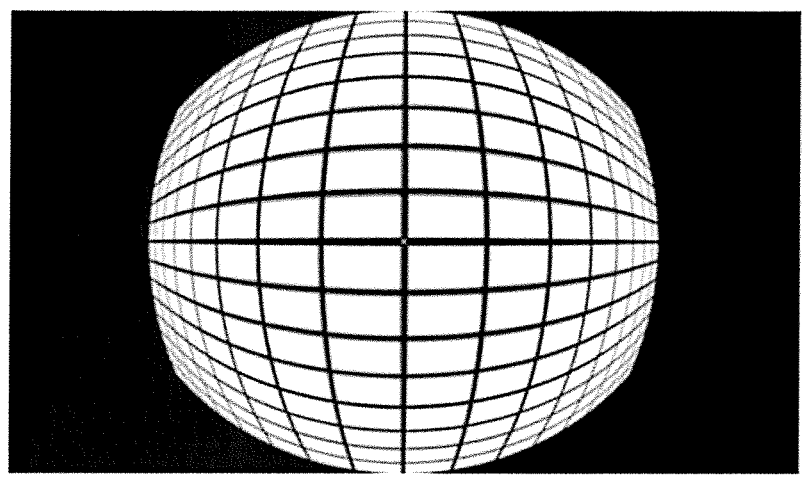
FIG. 7 is a diagram showing a state in which an image captured by a conventional fish-eye lens is formed on an imaging apparatus.
Figure 8:
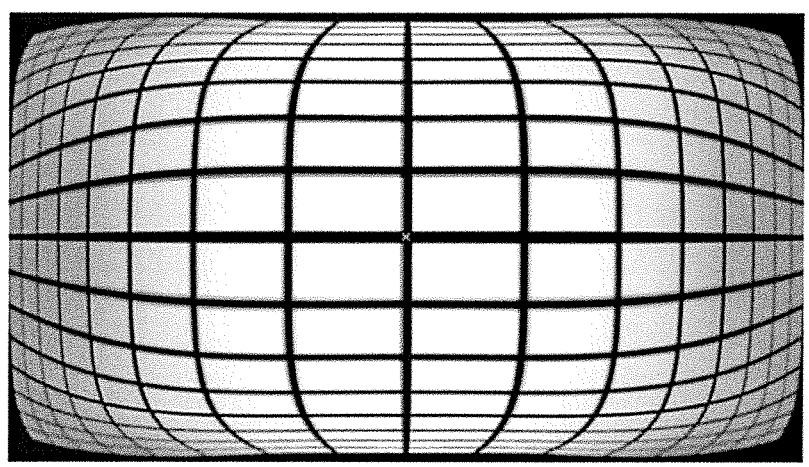
FIG. 8 is a diagram showing a state in which an image captured by a free-form surface lens according to Embodiment 1 is formed on an imaging apparatus.

It is also possible to use a free-form surface lens that has a shape that allows an image to be formed on the imaging surface of the imaging element such that the number of imaging pixels that capture the image, or in other words, the number of pixels indicated by white areas and black lines in FIGS. 7 and 8 is higher as shown in FIG. 8 than in FIG. 7 in which an entire image captured by a conventional spherical fish-eye lens is formed on the imaging surface of the imaging element. With this configuration, the imaging pixels of the imaging element can be used more effectively as compared with the case where an optical system composed mainly of a spherical lens is used. Thus, an image that has an even higher resolution can be obtained.

Also, in the case where imaging system 100 is attached to mobile body 201, a configuration may be used in which imaging system 100 acquires driving state information that indicates the driving state of mobile body 201, and the form of combination of images generated by generator 105 is changed based on the driving state information. For example, when mobile body 201 that is an automobile is in a normal driving state, generator 105 combines three image data sets including the rear image of the vehicle, and outputs a back view onto a rearview mirror display that is an example of display apparatus 202. When the automobile moves backward, for example, when driving state information indicating that the shift lever has been shifted to "R" is acquired, generator 105 outputs a top view image onto a monitor of a navigation system that is an example of display apparatus 202.

INDUSTRIAL APPLICABILITY

The imaging system and the mobile system are applicable to a mobile body that moves while carrying people such as an automobile, an aircraft, or a marine vessel, a mobile body that moves without carrying people such as a drone or a conveyance apparatus, and a mobile body such as a tip of a robot arm. The imaging system and the mobile system are also applicable to a security camera and the like.

What is claimed is:

1. An imaging system comprising:
a first imaging apparatus including a first imaging element in which a plurality of imaging pixels are arranged in a matrix, and a first optical system that forms an image of a first predetermined region on an imaging surface of the first imaging element;
a second imaging apparatus including a second imaging element, and a second optical system that forms an image of a second region on an imaging surface of the second imaging element, the second region partially overlapping the first predetermined region; and
a generator that generates an image based on image data acquired from the first imaging element and the second imaging element, wherein the first optical system includes a first lens that has a shape that causes the image of the first predetermined region to be formed on the imaging surface of the first imaging element such that a resolution is different between an overlapping portion of the first predetermined region that overlaps the second region and another portion of the first predetermined region, and in the first predetermined region, a resolution of the overlapping portion of the first predetermined region that overlaps the second region is higher than a resolution of the other portion of the first predetermined region, the second optical system includes a second lens that has a shape that causes an image of the second region on the second imaging element such that, in the second region, a resolution of the overlapping portion of the second region that overlaps with the first predetermined region is lower than another portion of the second region, and the generator generates a combined image based on image data of a portion having a high resolution out of the overlapping portion between the first predetermined region and the second region, and image data of a portion having a high resolution out of a non-overlapping portion between the second region and the first predetermined region.

2. The imaging system according to claim 1, wherein in the first lens included in the first optical system, the resolution gradually increases from one end portion toward the other end portion of the first predetermined region.

3. The imaging system according to claim 1, wherein the first lens included in the first optical system has a shape that allows the image of the first predetermined region to be formed on the imaging surface of the first imaging element such that the total number of the imaging pixels that capture the image of the first predetermined region is higher as compared with a case where an entire image captured by a fish-eye lens is formed.

4. The imaging system according to claim 1, wherein the first lens has a shape that causes the image of the first predetermined region to be formed on the imaging surface of the first imaging element such that the resolution is different between an overlapping portion of the first predetermined region that overlaps the second region and another portion of the first predetermined region, and the generator generates a combined image based on image data acquired from the first imaging element and the second imaging element.

5. The imaging system according to claim 4, further comprising:

a third imaging apparatus including a third imaging element and a third optical system that forms an image of a third region on an imaging surface of the third imaging element, the third region partially overlapping the second region and being different from the first predetermined region, wherein the first lens included in the first optical system has a shape that causes the resolution to be higher in the overlapping portion of the first predetermined region that overlaps the second region than in the other portion of the first predetermined region, the second optical system includes a second lens that has a shape that causes the image of the second region to be formed on the second imaging element such that in the second region, an overlapping portion between the first predetermined region and the second region and an overlapping portion between the third region and the second region have a resolution lower than a resolution of another portion of the second region, the third optical system includes a third lens that has a shape that causes the image of the third region to be formed on the third imaging element such that in the third region, an overlapping portion between the third region and the second region has a resolution higher than a resolution of another portion of the third region, and the generator generates a combined image based on image data of the overlapping portion between the first predetermined region and the second region, image data of the overlapping portion between the third region and the second region, and image data of the second region.

6. The imaging system according to claim 5, further comprising:

a fourth imaging apparatus including a fourth imaging element and a fourth optical system that forms an image of a fourth region on an imaging surface of the fourth imaging element, the fourth region partially overlapping the first predetermined region and the third region and being located in a direction opposite to the second region, wherein the generator generates a combined image showing surroundings based on image data acquired from the first imaging element, the second imaging element, the third imaging element, and the fourth imaging element.

7. The imaging system according to claim 1, wherein when a planar region is provided in parallel or substantially parallel to an optical axis within the first predetermined region, the first optical system that includes the first lens has a higher resolution in a portion far from the optical axis than in a portion close to the optical axis in a direction extending along the planar region, and the generator generates an image in which a shape of the planar region is reproduced by enlarging an image of a high-resolution portion relative to an image of a low-resolution portion based on the image data acquired from the first imaging element.

8. The imaging system according to claim 1, wherein when a planar region is provided in parallel or substantially parallel to an optical axis within the first predetermined region, the first lens included in the first optical system has a higher resolution in a portion far from the first optical system in the planar region than in a portion close to the first optical system in the planar region, and the generator generates an image in which a shape of the planar region is reproduced by enlarging an image of a high-resolution portion relative to an image of a low-resolution portion based on the image data acquired from the first imaging element.

9. The imaging system according to claim 7, wherein when the planar region is provided in parallel or substantially parallel to the optical axis within the first predetermined region, the first lens included in the first optical system has a higher resolution in the portion far from the first optical system in the planar region than in the portion close to the first optical system in the planar region, and the generator generates the image in which the shape of the planar region is reproduced by enlarging the image of the high-resolution portion relative to the image of the low-resolution portion based on the image data acquired from the first imaging element.

10. The imaging system according to claim 1, including:
a fifth imaging apparatus including a fifth imaging element and a fifth optical system that forms an image of a fifth region on an imaging surface of the fifth imaging element, the fifth region including a first planar region; and
a sixth imaging apparatus including a sixth imaging element and a sixth optical system that forms an image of a sixth region on an imaging surface of the sixth imaging element, the sixth region including a second planar region that makes contact with the first planar region within a same plane with the first planar region,
the fifth optical system includes a fifth lens that has a shape that causes the image of the fifth region to be formed on the imaging surface of the fifth imaging element such that the resolution is higher in a portion close to the second planar region than in a portion close to an optical axis of the fifth optical system in a direction extending along the first planar region,
the sixth optical system includes a sixth lens that has a shape that causes the image of the sixth region to be formed on the imaging surface of the sixth imaging element such that the resolution is higher in a portion close to the first planar region than in a portion close to an optical axis of the sixth optical system in a direction extending along the second planar region, and
the generator generates, based on a high-resolution portion of image data acquired from the fifth imaging element and the sixth imaging element, a combined image in which the first planar region and the second planar region are connected.

11. The imaging system according to claim 1, including:
a fifth imaging apparatus including a fifth imaging element and a fifth optical system that forms an image of a fifth region on an imaging surface of the fifth imaging element, the fifth region including a first planar region; and
a sixth imaging apparatus including a sixth imaging element and a sixth optical system that forms an image of a sixth region on an imaging surface of the sixth imaging element, the sixth region including a second planar region that makes contact with the first planar region within a same plane with the first planar region,
the fifth optical system includes a fifth lens that has a shape that causes the image of the fifth region to be formed on the imaging surface of the fifth imaging element such that the resolution is higher in a portion far from the fifth optical system than in a portion close to the fifth optical system in the first planar region,
the sixth optical system includes a sixth lens that has a shape that causes the image of the sixth region to be formed on the imaging surface of the sixth imaging element such that the resolution is higher in a portion far from the sixth optical system than in a portion close to the sixth optical system in the second planar region, and
the generator generates a combined image in which shapes of the first planar region and the second planar region and an arrangement of the first planar region and the second planar region are reproduced by enlarging an image of a high-resolution portion relative to an image of a low-resolution portion based on image data acquired from the fifth imaging element and the sixth imaging element.

12. The imaging system according to claim 10, including:
the fifth imaging apparatus including the fifth imaging element and the fifth optical system that forms the image of the fifth region on the imaging surface of the fifth imaging element, the fifth region including the first planar region; and
the sixth imaging apparatus including the sixth imaging element and the sixth optical system that forms the image of the sixth region on the imaging surface of the sixth imaging element, the sixth region including the second planar region that makes contact with the first planar region within the same plane with the first planar region,
the fifth optical system includes the fifth lens that has a shape that causes the image of the fifth region to be formed on the imaging surface of the fifth imaging element such that the resolution is higher in a portion far from the fifth optical system than in a portion close to the fifth optical system in the first planar region,
the sixth optical system includes the sixth lens that has a shape that causes the image of the sixth region to be formed on the imaging surface of the sixth imaging element such that the resolution is higher in a portion far from the sixth optical system than in a portion close to the sixth optical system in the second planar region, and
the generator generates a combined image in which shapes of the first planar region and the second planar region and an arrangement of the first planar region and the second planar region are reproduced by enlarging an image of a high-resolution portion relative to an image of a low-resolution portion based on image data acquired from the fifth imaging element and the sixth imaging element.

13. A mobile system comprising:
a first imaging apparatus including a first imaging element in which a plurality of imaging pixels are arranged in a matrix, and a first optical system that forms an image of a first predetermined region on an imaging surface of the first imaging element;
a second imaging apparatus including a second imaging element, and a second optical system that forms an image of a second region on an imaging surface of the second imaging element, the second region partially overlapping the first predetermined region; and
a mobile body to which the imaging apparatus is attached and that moves in a space;
a generator that generates an image based on image data acquired from the first imaging element and the second imaging element,
a display apparatus that displays the image generated by the generator,
wherein the first optical system includes a first lens that has a shape that causes the image of the list predetermined region to be formed on the imaging surface of the first imaging element such that a resolution is different between an overlapping portion of the first predetermined region that overlaps the second region and another portion of the first predetermined region, and in the first predetermined region, a resolution of the overlapping portion of the first predetermined region that overlaps the second region is higher than a resolution of the other portion of the first predetermined region, the second optical system includes a second lens that has a shape that causes an image of the second region on the second imaging element such that, in the second region, a resolution of the overlapping portion of the second region that overlaps with the first predetermined region is lower than another portion of the second region, and the generator generates a combined image based on image data of a portion having a high resolution out of the overlapping portion between the first predetermined region and the second region, and image data of a portion having a high resolution out of a non-overlapping portion between the second region and the first predetermined region.

14. The imaging system according to claim 1, wherein the first lens and the second lens are both free-form surface lenses.

* * * * *